United States Patent
Bria et al.

(10) Patent No.: US 7,308,904 B2
(45) Date of Patent: Dec. 18, 2007

(54) ELECTRIC GEAR MOTOR DRIVE FOR SWITCHING VALVE

(75) Inventors: Michael P. Bria, Green Bay, WI (US); George D. Glenn, Green Bay, WI (US); Randall M. Schneider, New London, WI (US)

(73) Assignee: Megtec Systems, Inc., DePere, WI (US)

( * ) Notice: Subject to any disclaimer, the term of this patent is extended or adjusted under 35 U.S.C. 154(b) by 379 days.

(21) Appl. No.: 10/987,668

(22) Filed: Nov. 12, 2004

(65) Prior Publication Data

US 2006/0102864 A1    May 18, 2006

(51) Int. Cl.
*F16K 31/04* (2006.01)

(52) U.S. Cl. ............... 137/311; 137/554; 251/129.12; 251/129.13; 432/180

(58) Field of Classification Search ........... 251/129.11, 251/129.12, 129.13; 137/309, 311, 553, 137/554; 432/179, 180, 181
See application file for complete search history.

(56) References Cited

U.S. PATENT DOCUMENTS

| | | | | |
|---|---|---|---|---|
| 887,253 | A | | 5/1908 | Jackson |
| 3,584,276 | A | * | 6/1971 | Ringland et al. ............ 318/721 |
| 4,370,631 | A | | 1/1983 | Gerber et al. ................ 333/106 |
| 4,759,386 | A | | 7/1988 | Grouw, III .................... 137/554 |
| 4,807,662 | A | | 2/1989 | Verne .......................... 137/554 |
| 4,875,623 | A | | 10/1989 | Garris ....................... 236/12.12 |
| 4,951,915 | A | | 8/1990 | Piao .............................. 251/14 |
| 5,134,945 | A | * | 8/1992 | Reimlinger et al. ......... 137/309 |
| 5,362,449 | A | * | 11/1994 | Hedenhag .................... 432/180 |
| 5,540,584 | A | * | 7/1996 | Greco .......................... 432/179 |
| 5,762,098 | A | * | 6/1998 | Manzone et al. ....... 251/129.04 |
| 5,803,404 | A | * | 9/1998 | Petrou et al. ................ 310/106 |
| 5,871,349 | A | * | 2/1999 | Johnson et al. ............. 432/180 |
| 5,937,835 | A | | 8/1999 | Turner et al. ........... 123/568.24 |
| 5,983,743 | A | | 11/1999 | McGregor et al. ......... 74/424.8 |
| 6,039,927 | A | * | 3/2000 | Greco .......................... 137/309 |
| 6,097,123 | A | | 8/2000 | Weiss et al. ................. 310/105 |
| 6,261,092 | B1 | | 7/2001 | Cash ........................... 432/180 |
| 6,267,352 | B1 | * | 7/2001 | Semeyn et al. ......... 251/129.12 |
| 6,279,870 | B1 | * | 8/2001 | Welz et al. ............. 251/129.04 |
| 2003/0201742 | A1 | * | 10/2003 | Pringle et al. ............... 318/466 |

OTHER PUBLICATIONS

The International Search Report dated Nov. 29, 2006.

* cited by examiner

*Primary Examiner*—John Bastianelli
(74) *Attorney, Agent, or Firm*—Mitchell Bittman; Kevin Lemack (57) ABSTRACT

Electric drive for a switching valve, the switching valve having such a drive, and a regenerative thermal oxidizer including the switching valve and drive system. The electric drive system allows for the starting and stopping of the rotation of a rotary valve with accurate positioning. The stopping of the valve includes dissipation of the kinetic energy of the valve by electric means. The valve is allowed to move vertically and oscillating rotary motion is possible. The drive system preferably includes a gear, gearbox, variable speed drive and at least one positioning sensor. Valve acceleration and deceleration can be carried out in a controlled fashion and with repeatability, so that the final end position of the valve is consistent. The accommodation of vertical movement of the valve is also within the scope of the present invention.

13 Claims, 7 Drawing Sheets

ELECTRIC GEAR MOTOR DRIVE FOR SWITCHING VALVE

BACKGROUND OF THE INVENTION

Regenerative thermal oxidizers are conventionally used for destroying volatile organic compounds (VOCs) in high flow, low concentration emissions from industrial and power plants. Such oxidizers typically require high oxidation temperatures in order to achieve high VOC destruction. To achieve high heat recovery efficiency, the "dirty" process gas which is to be treated is preheated before oxidation. A heat exchanger column is typically provided to preheat these gases. The column is usually packed with a heat exchange material having good thermal and mechanical stability and sufficient thermal mass. In operation, the process gas is fed through a previously heated heat exchanger column, which, in turn, heats the process gas to a temperature approaching or attaining its VOC oxidation temperature. This pre-heated process gas is then directed into a combustion zone where any incomplete VOC oxidation is usually completed. The treated now "clean" gas is then directed out of the combustion zone and back through the heat exchanger column, or through a second heat exchange column. As the hot oxidized gas continues through this column, the gas transfers its heat to the heat exchange media in that column, cooling the gas and pre-heating the heat exchange media so that another batch of process gas may be preheated prior to the oxidation treatment. Usually, a regenerative thermal oxidizer has at least two heat exchanger columns which alternately receive process and treated gases. This process is continuously carried out, allowing a large volume of process gas to be efficiently treated.

The performance of a regenerative oxidizer may be optimized by increasing VOC destruction efficiency and by reducing operating and capital costs. The art of increasing VOC destruction efficiency has been addressed in the literature using, for example, means such as improved oxidation systems and purge systems (e.g., entrapment chambers), and three or more heat exchangers to handle the untreated volume of gas within the oxidizer during switch-over. Operating costs can be reduced by increasing the heat recovery efficiency, and by reducing the pressure drop across the oxidizer. Operating and capital costs may be reduced by properly designing the oxidizer and by selecting appropriate heat transfer packing materials.

An important element of an efficient oxidizer is the valving used to switch the flow of process gas from one heat exchange column or bed to another. Any leakage of untreated process gas through the valve system will decrease the efficiency of the apparatus. In addition, disturbances and fluctuations in the pressure and/or flow in the system can be caused during valve switch-over and are undesirable. Valve wear is also problematic, especially in view of the high frequency of valve switching in regenerative thermal oxidizer applications.

U.S. Pat. No. 6,261,092, the disclosure of which is hereby incorporated by reference, discloses a switching valve suitable for regenerative thermal oxidizers that addresses the foregoing issues. The drive system disclosed in the '092 patent is of the rack and pinion type with pneumatic cylinder actuation.

The rack and pinion pneumatically powered drive system has a number of limitations. First, it is a constant force design since the pneumatic air supply is typically regulated to a constant pressure. However, the conditions acting on the rotary switch valve will vary and result in varying force on the valve sealing surface. The resulting friction at the top sealing surface of the valve is a major factor in determining the force required to rotate the valve. Since this force is not constant, and the pneumatic cylinder actuation force is relatively constant, the performance of the drive system will vary. In some cases, it may not be able to rotate the valve. In other cases, it may rotate the valve too quickly and overcome the means to stop the valve.

A second limitation of the pneumatically actuated drive system is the minimal braking capacity of the pneumatic cylinder. Typically, only pneumatic air cushions or rubber cushions are available to absorb the energy of the moving drive and valve. Only small valves can be safely braked by these devices. Larger valves require that external energy absorbing devices such as shock absorbers be used to brake the valve. These devices increase the cost and reduce reliability of the drive.

A third limitation of the pneumatically actuated drive is that use in cold environments requires an extremely dry air supply to prevent ice blockage of the air line. This requires the addition of an expensive air drying device.

Finally, the rack and pinion pneumatic drive system has mechanical stops which are used to locate the valve accurately. However, failure of the valve braking device or rotating the valve too quickly and exceeding the capacity of the braking device may allow the drive and/or valve to become damaged by impact with the stops.

It would be desirable to provide an alternative drive system for a rotary valve, such as for the valve disclosed in the '092 patent, that allows for smooth and reliable operation, is cost effective, and is low maintenance. It also would be desirable to provide a regenerative thermal oxidizer that utilizes a valve equipped with such a drive system.

SUMMARY OF THE INVENTION

The problems of the prior art have been overcome by the present invention, which provides an electric drive for a switching valve, the switching valve having such a drive, and a regenerative thermal oxidizer including the switching valve and drive system. The electric drive system allows for the starting and stopping of the rotation of a rotary valve with accurate positioning. The stopping of the valve includes dissipation of the kinetic energy of the valve by electric means. The valve is allowed to move vertically and oscillating rotary motion is possible.

The drive system preferably includes a gear, gearbox, motor with variable frequency drive with dynamic braking capability and at least one positioning sensor. The system allows for the frequent starting and stopping of the rotation of a rotary valve with accuracy; valve acceleration and deceleration can be carried out in a controlled fashion and with repeatability, so that the final end position of the valve is consistent without the use of mechanical stops. The accommodation of vertical movement of the valve is also within the scope of the present invention.

In a preferred embodiment, the valve with which the drive system is used has a seal plate that defines two chambers, each chamber being a flow port that leads to one of two regenerative beds of the oxidizer. The valve also includes a switching flow distributor which provides alternate channeling of the inlet or outlet process gas to each half of the seal plate. The valve operates between two modes: a stationary mode and a valve movement mode. In the stationary mode, a tight gas seal is used to minimize or prevent process gas leakage. The gas seal also seals during valve movement. The valve is a compact design, thereby eliminating ducting typically required in conventional designs. This provides less volume for the process gas to occupy during cycling, which leads to less dirty process gas left untreated during cycling. Associated baffling minimizes or eliminates untreated process gas leakage across the valve during switch-over. The use of a single valve, rather than the two or four conventionally used, significantly reduces the area that requires sealing. The geometry of the switching flow distributor reduces the distance and number of turns the process gas goes through since the flow distributor can be located close to the heat exchange beds. This reduces the volume of trapped, untreated gas during valve switching. Since the process gas passes through the same valve ports in the inlet cycle as in the outlet cycle, gas distribution to the heat exchange beds is improved.

Valve switching with minimal pressure fluctuations, excellent sealing, and minimal or no bypass during switching is achieved. In view of the reduction or elimination of bypass during switching, the conventional entrapment chambers used to store the volume of unprocessed gas in the system during switching can be eliminated, thereby saving substantial costs.

DETAILED DESCRIPTION OF THE PRESENT INVENTION

Figure 1:
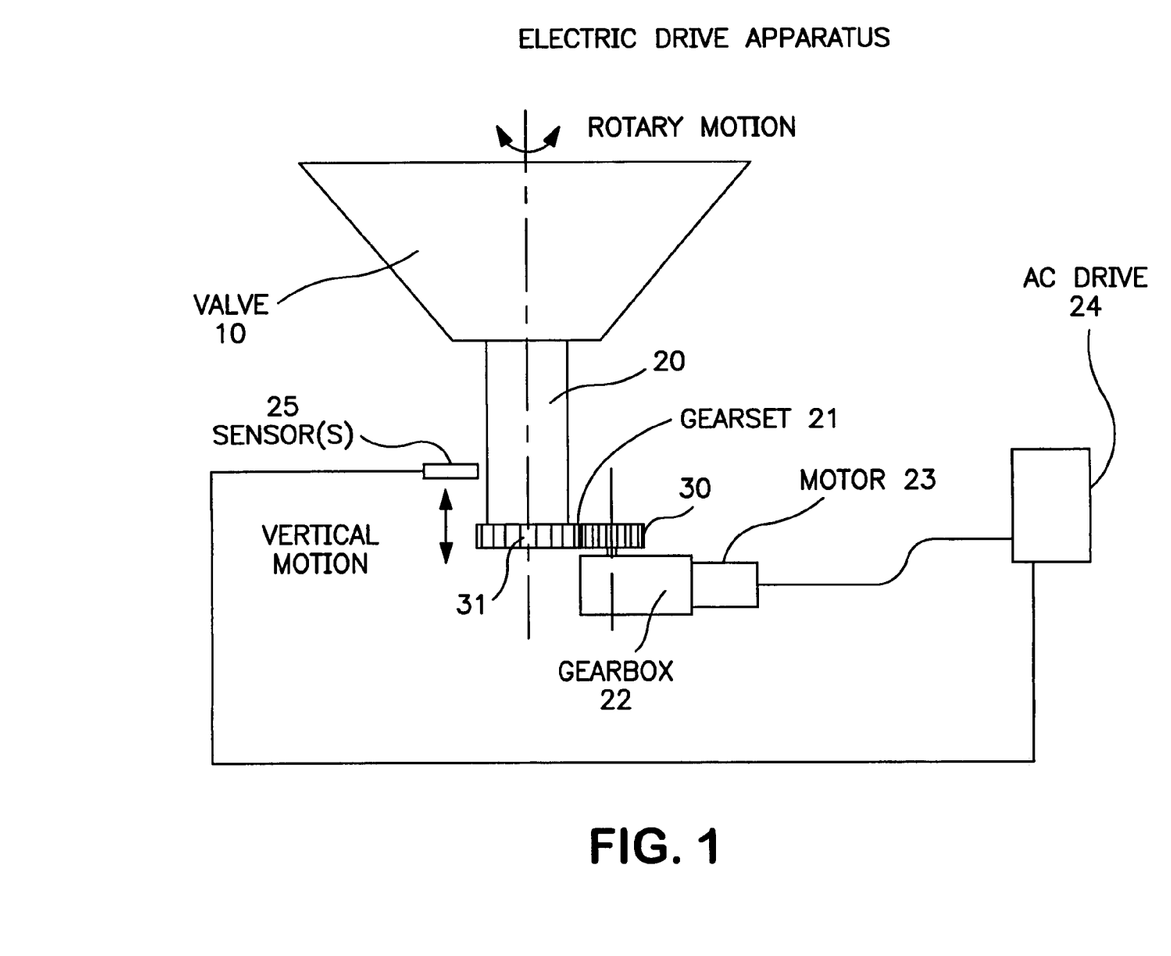
FIG. 1 is a schematic view of a valve equipped with the electric gear motor drive in accordance with the present invention.
Figures 2A, 2B:
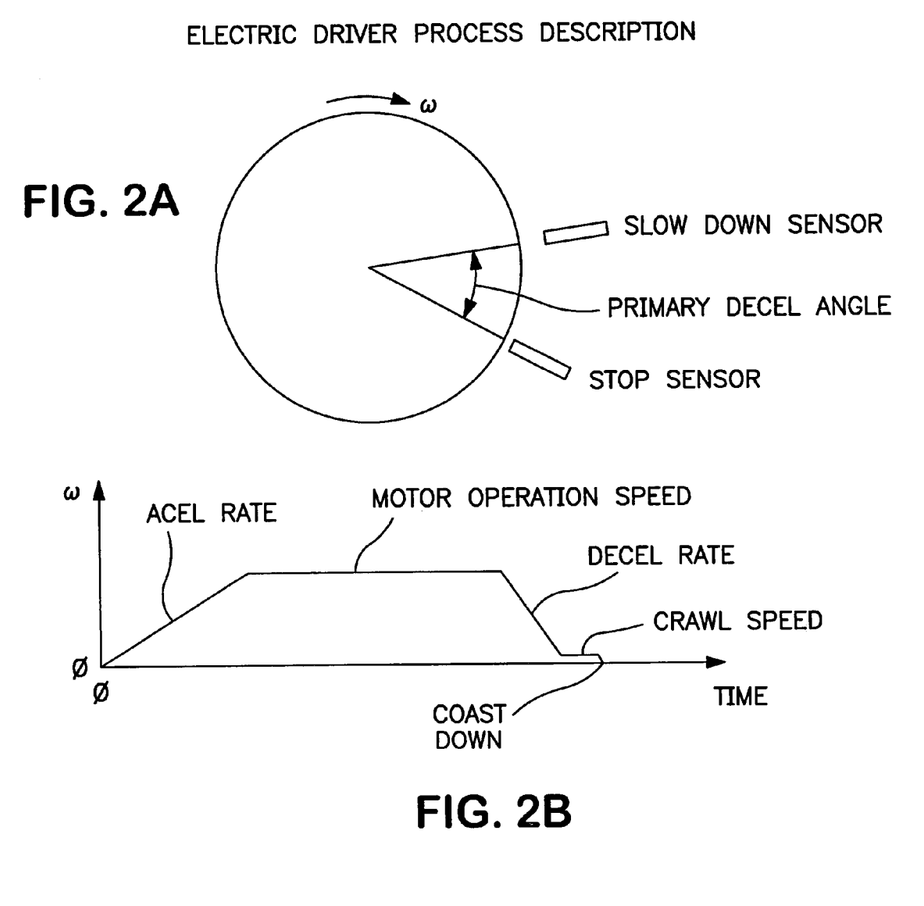
FIGS. 2A and 2B are illustrations of the electric gear motor operation in accordance with the present invention.
Figure 6:
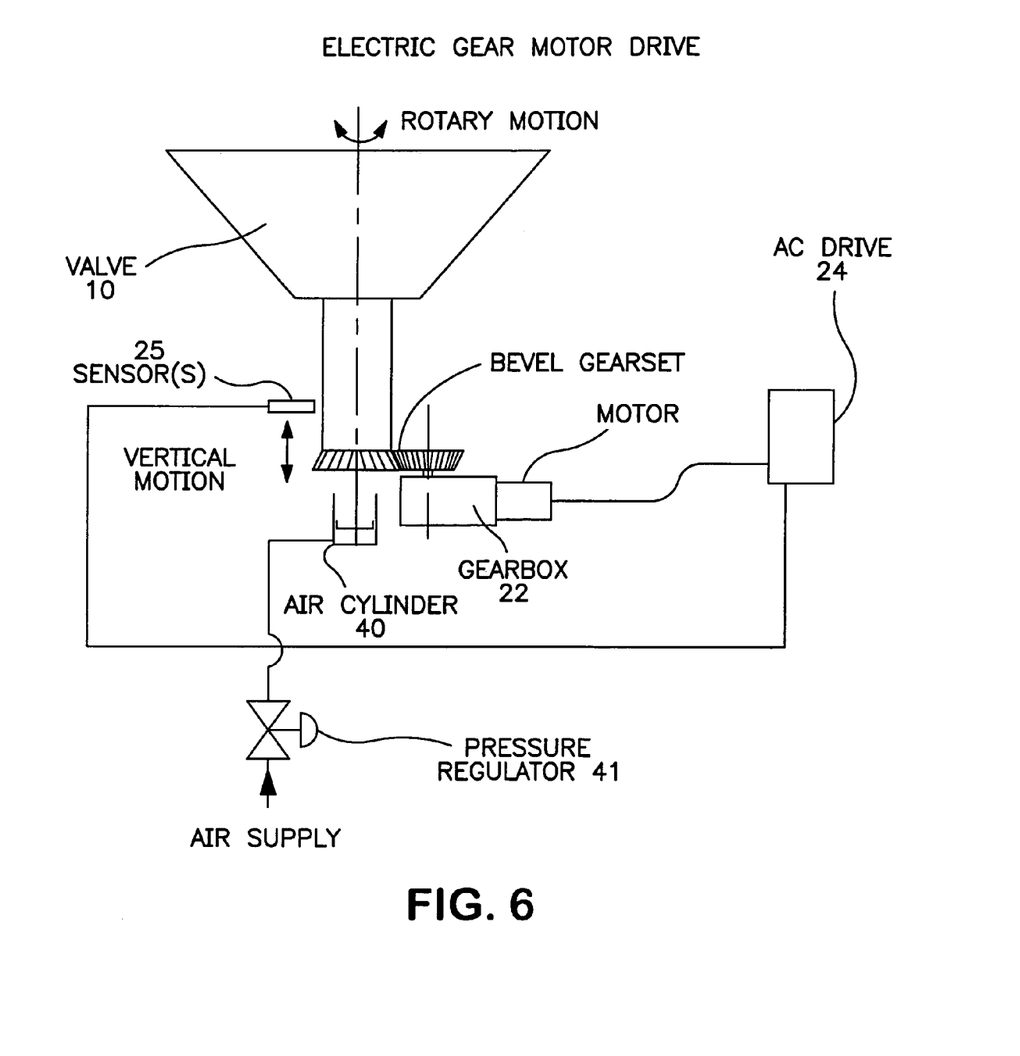
FIG. 6 is a schematic view of a valve equipped with an electric motor drive using a bevel gearset in accordance with an alternative embodiment.

Turning first to FIGS. 1 and 2, there is shown schematically the electric gear motor drive system in accordance with one embodiment of the present invention, coupled to a rotary valve 10. The valve 10 includes a shaft 20 connected to a gear set 21. The gear set 21 is driven by gears housed in gear box 22, which are driven by motor 23 powered by an AC drive 24 as shown. In the embodiment shown, the gear box 22 is supported by a gearbox mounting plate 7 (FIG. 3) that is in turn supported by a pair of spaced base frame mounting beams 5. This structure is capable of withstanding the torque that occurs during operation of the system. Gear set 21 is made up of gears 30 and 31. Gear 30 mates to gear 31 mounted to the valve, such as on shaft 20. Gear 30 is driven by the gears in the gear box 22, which in turn are driven by motor 23. Preferably the gears 30, 31 are spur gears to allow the assembly to accommodate vertical motion of the valve 10. Vertical motion is typically done using a pneumatic cylinder. However, other devices could be used to position the valve vertically including a screw-type actuator or a compression spring. A bevel gear set could also be used, but the valve would then permit vertical motion in only one direction as shown in FIG. 6.

The main function of the gearbox 22 is to increase the torque output and reduce the speed of the electric motor 23 used to actuate the valve. Thus, the gearbox 22 provides the proper torque and output speed for the high speed motor 23. For example, a 5 horsepower, 1800 rpm motor with a 125:1 gear reduction can provide an output speed of about 14 rpm and a starting torque of about 2000 ft-lbs (compared to torque of only about 15 to 16 ft-lbs. without the gear reduction). The mating gears 30 and 31 do not need to be the same size. These gears can be used as a second speed reducer set, particularly when the speed reduction desired requires more than one stage.

Figure 3:
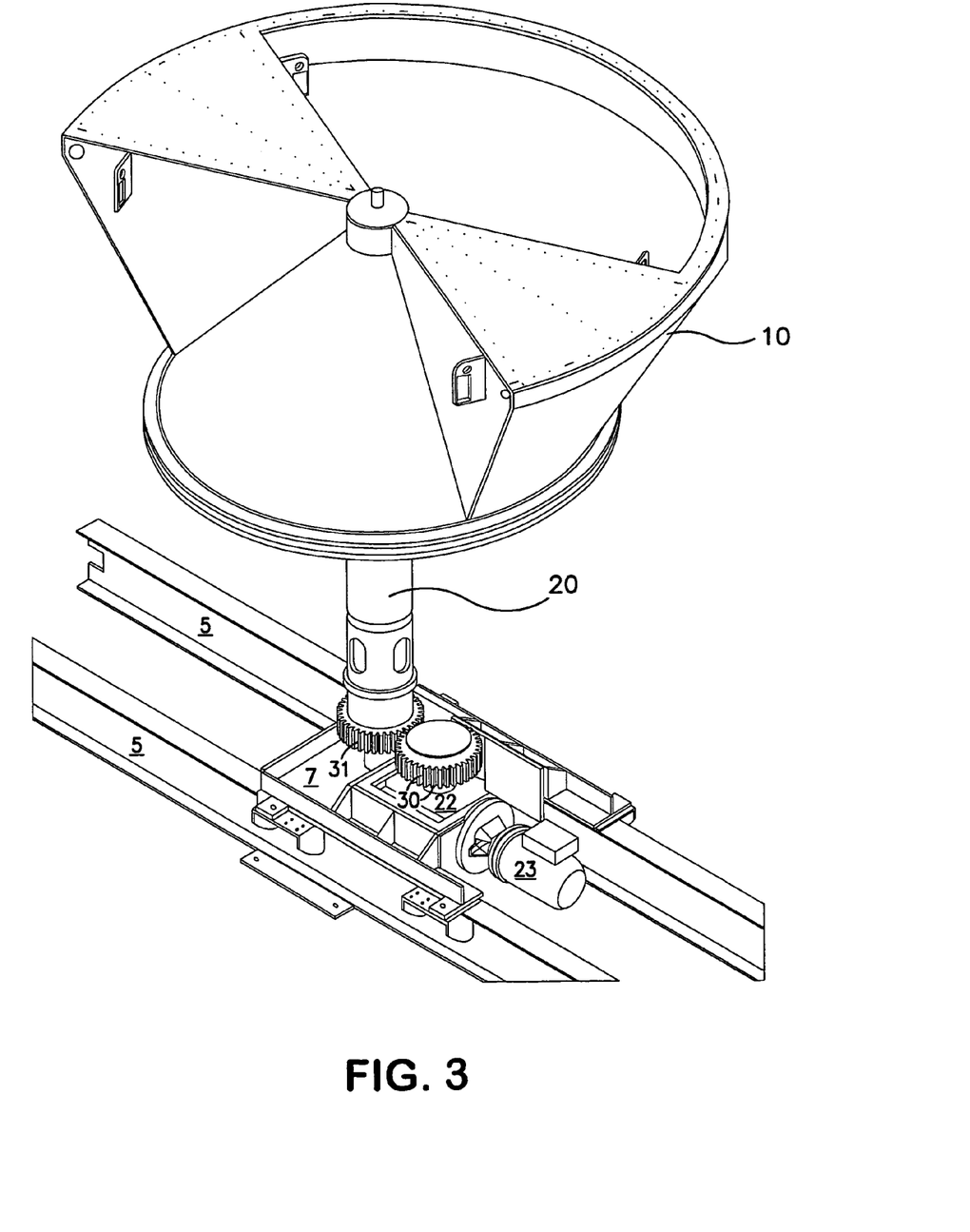
FIG. 3 is a perspective view of the valve and electric gear motor drive in accordance with the present invention.

Suitable gearboxes 22 include right-angle gearboxes and in-line (i.e., planetary style) gearboxes, with the former being preferred in view of space constraints. In a right-angle gear set, the axes of the input and output shafts are perpendicular rather than in-line, and thus the overall height of the gear train is less than with in-line configurations. The right-angle gearbox also allows the motor to be mounted in a direction perpendicular to the vertical output shaft as shown in FIG. 3. A three-stage helical-bevel style right-angle gearbox is particularly preferred, although those skilled in the art will appreciate that other right-angle gearboxes, such as helical worm style gearboxes, can be used.

Figure 5:
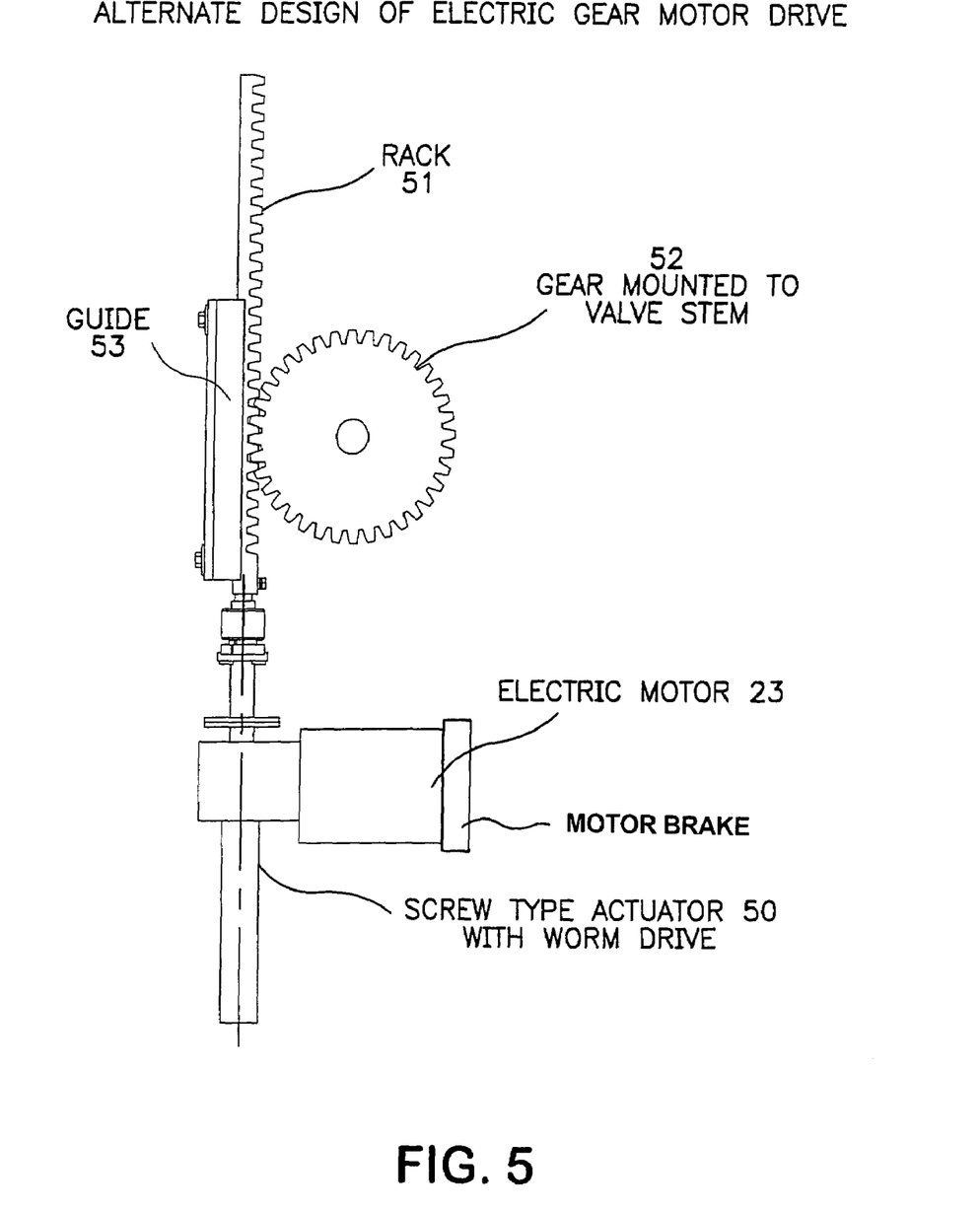
FIG. 5 is a schematic view of an electric drive using a rack in accordance with another embodiment of the present invention.

The desired torque increase from the electrical motor could be obtained through means other than a gearbox with the appropriate gear reduction. For example, a gearbox combined with a belt drive system could be used. Alternatively, multiple stages of belt drives could be used. Alternatively still, FIG. 5 illustrates an electric motor 23 that drives a screw-type actuator 50 having a worm drive. The screw-type actuator 50 actuates rack 51 that is guided by guide 53 and which in turn drives gear 52 mounted to the valve stem of the valve 10.

The electric motor 23 is typically about 460 volts, 60 cycle, 1800 rpm and is powered by a suitable alternating current source.

One or more position sensors, such as inductive proximity sensors, preferably are used to sense the position of the valve in order to accurately and reproducibly stop the valve at the desired location to ensure proper sealing. Preferably a first sensor is positioned to trigger the deceleration of the motor, and a second or stop sensor is positioned to stop the motor. The precise location of these sensors is within the skill in the art. Suitable alternative means of determining position of the valve include a limit switch and actuator such as a cam, an encoder, counting of gear teeth with a proximity sensor, a photo eye and light source, and a Hall effect vane switch.

If an incremental encoder or the counting of gear teeth is used to control the valve motion, the risk of missing a count exists. Once this occurs, over time the valve positioning becomes incorrect. A preferred device is an absolute encoder that converts angular position to a 4-20 ma signal. This eliminates the risk of missing a count and not locating the valve properly.

Braking of the valve is important in order to ensure that the valve is positioned properly and precisely after each switching operation. If the valve is not properly positioned after switching, leakage and inefficient VOC destruction in the oxidizer can result. Accordingly, preferably the braking causes the valve to reach crawl speed before a stop sensor is encountered. The AC variable speed drive preferably includes extra capacity power dissipating resistors and thermal protection circuitry for better braking capability. However, a larger horsepower motor and variable frequency drive without external braking resistors alternately could be used. The drive must effectively dissipate the kinetic energy of the rotating valve electrically. An alternative to a resistor to dissipate the electrical energy is to charge a storage device such as a battery. Alternatively, a motor brake, mechanical valve stops, DC current injection to the motor, or frictional force between the valve and seal plate of the RTO can be used to brake the valve.

FIGS. 2A and 2B summarize the operation of the electric gear drive of the present invention. In operation, the motor accelerates to operating speed, which in the embodiment illustrated is about 1750 rpm at 60 Hz. The motor then operates at this predetermined set speed until the slow down sensor is triggered, whereupon the motor is decelerated by the AC drive to crawl speed, typically 150 rpm at 5 Hz. The motor runs at crawl speed until the stop sensor is triggered. For example, for the 180 degrees of valve rotation during a switch, the actual amount of rotation of the valve during crawl mode is about 2 degrees. Once the stop sensor is triggered, the motor coasts down from crawl speed to a stop. This sequence also is shown graphically in FIG. 2B.

Figure 7:
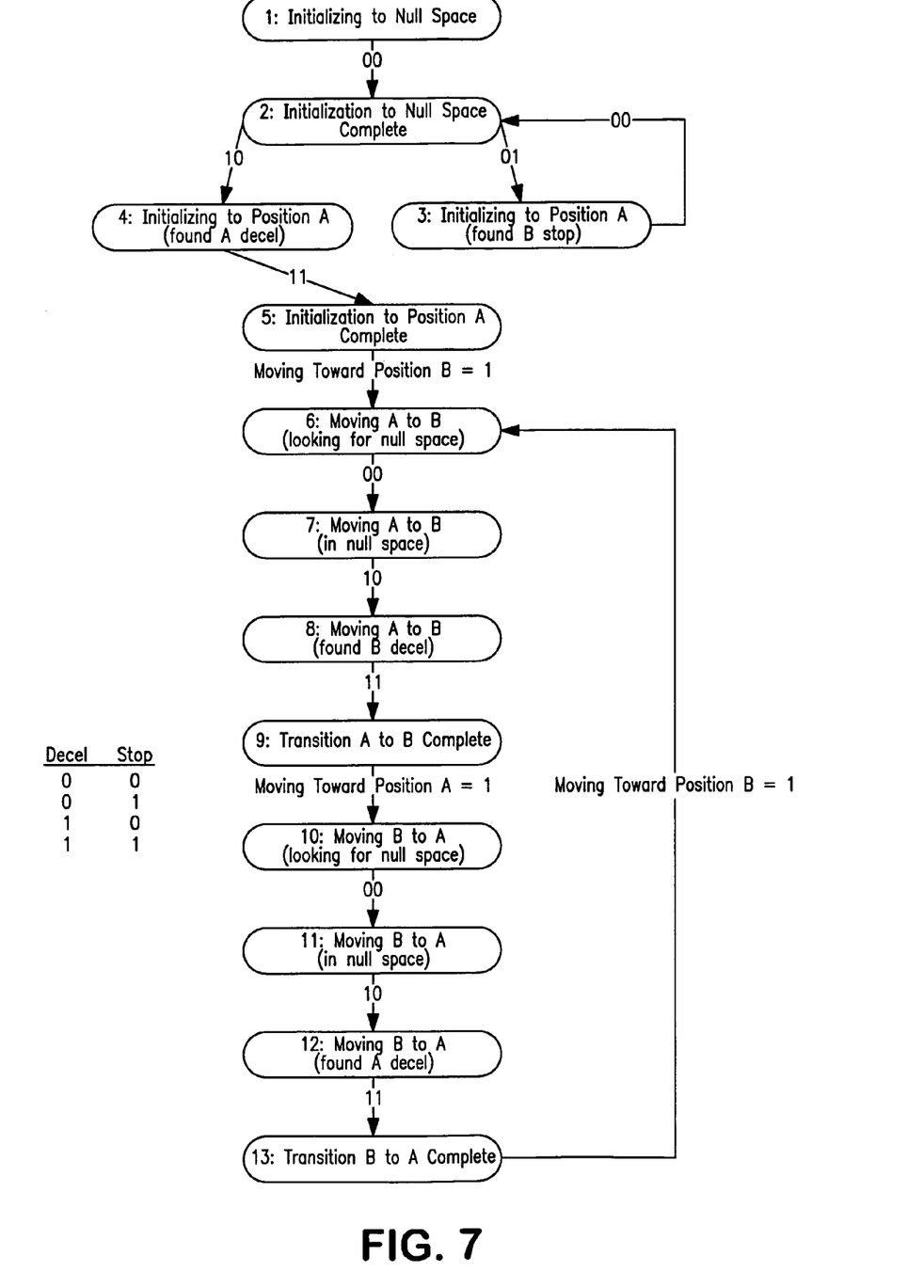
FIG. 7 is a logic flowchart showing an embodiment of the operation of the drive system of the present invention.

The logic flow diagram for the preferred operation with a stop sensor and a deceleration or crawl sensor is found in FIG. 7. The initialization part of the logic sequence is needed to orient the valve to a reference position selected to be A. Once the reference position is found, the valve will be positioned accurately when it moves from position A to position B. Note that null space simply means that neither the stop or deceleration sensor senses a target at that valve rotation location. In the initialized state, both the deceleration and the stop sensors see their targets. The initialization process only allows the valve to rotate in one direction until it reaches position A. Sensors and targets are arranged so that the system can differentiate between positions A and B to insure the correct starting position is always achieved.

During rotation from position A to B, the valve accelerates to a fixed speed and operates at that speed until the deceleration target is sensed. Then the valve is slowed to crawl speed and rotates at this speed until the stop target engages the stop sensor. The rotation from position B to A occurs in the opposite rotational direction and has the same logic sequence. Note that initialization only occurs when the valve drive operation is first started from a power off situation.

Typical interaction between a PLC device and the variable frequency drive involves the exchange of information related to the position sensor signals. For example based on the position sensor signals, the PLC will cause the motor drive to change direction of rotation or speed of rotation. In addition, a PLC typically provides valuable fault information for diagnosing problems in the equipment operation. However, some AC drives have the ability to process sensor information and could operate independently of a PLC device.

Valve switch time specifications preferably are chosen to minimize the capture chamber volume in the regenerative thermal oxidizer. The capture chamber prevents release of uncleaned gas during the valve switch operation. The faster the valve switches, the smaller the capture chamber can be. Thus, there is no lower specification limit for valve switch time. The upper limit is based upon the capabilities of the drive and is generally set at less than five (5) seconds, not including the time in crawl mode. During crawl mode, the seal plate is already adequately aligned to prevent release of uncleaned gas.

Figure 4:
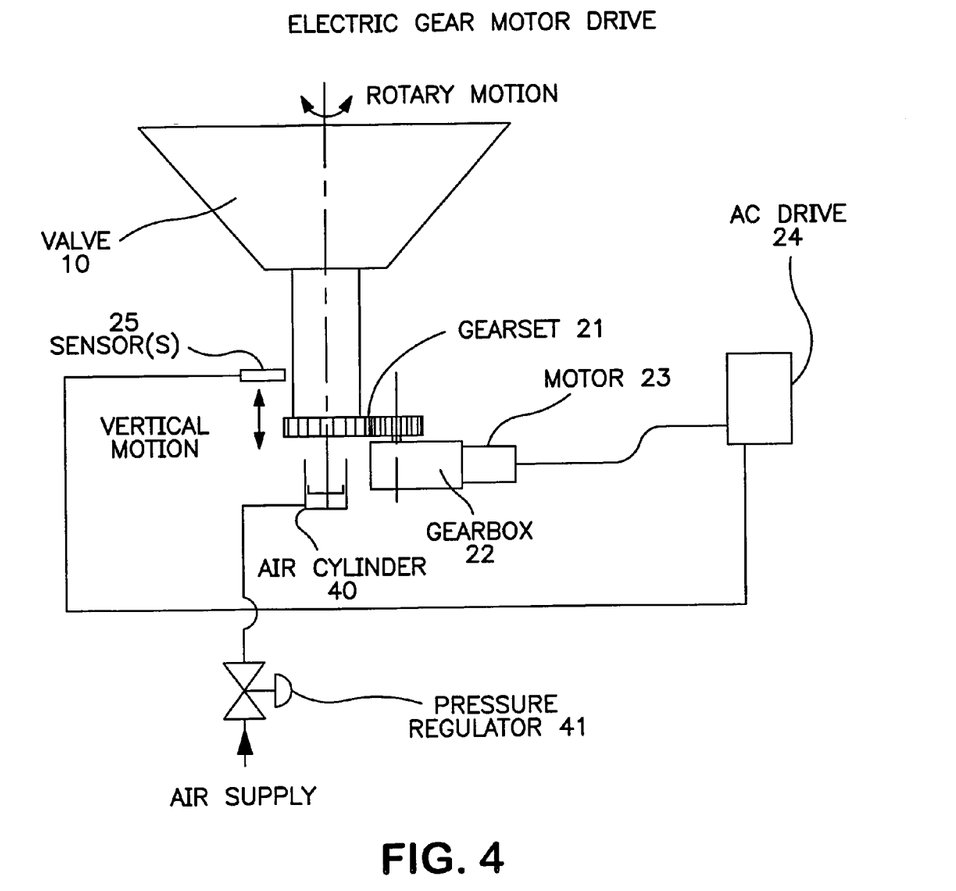
FIG. 4 is a schematic view of a valve equipped with the electric gear motor drive in accordance with another embodiment of the present invention.

One or more sensors 25 can be appropriately positioned to sense the vertical motion of the valve 10. Thus, with reference to FIG. 4, a pneumatic cylinder 40, such as an air cylinder, and an electro-pneumatic regulator 41 that converts an electrical signal to a pressure output can be used to move the valve 10 vertically. This can be carried out simultaneously with the rotary motion of the valve. A signal is given indicating that the valve is set up at the correct pressure for rotation. The device also can aid valve rotation by reducing the lift force of the air cylinder 40 if the rotation is stalled due to excess drag. The stopping and positioning of the valve also can be aided by increasing the lift pressure when the valve triggers the stop sensor.

The system allows for the variation of acceleration rate, deceleration rate, motor operating speed, crawl speed and position sensor angular location in order to achieve the desired valve rotation speed, smoothness of operation and final positioning accuracy, despite the frequent start/stop operation. For example, one suitable set of operation parameters uses an acceleration rate of 1.1 seconds, a deceleration rate of 0.5 seconds, a maximum motor speed of 55 Hz, and a crawl speed of 3 Hz. Using electric power to actuate the valve also avoids the problem of moisture in compressed air of pneumatic systems.

The electric drive of the present invention is simple to set up and replace, requiring only installation of the gearbox and mating gear and leveling of the assembly. Smooth and quiet acceleration and braking of the valve is accomplished, with reduced impact loading and vibration during the valve speed ramping up and down. The AC drive parameters can be changed remotely, and remote diagnostics can also be employed. No linear guiding of parts and few mechanical connections results in fewer alignment concerns and the resulting premature wearing of components. The device is also less sensitive to valve/seal plate interface conditions, as the drive will adjust the motor output to maintain acceleration and deceleration rates up to preset limits.

What is claimed is:

1. A regenerative thermal oxidizer comprising at least first and second heat exchange columns each in communication with a combustion zone, a valve for directing gas flow into and out of said columns, and an electric motor drive for actuating said valve, said motor drive comprising an electric motor, means associated with said motor to increase the torque output of said motor, a motor brake, and a first position sensor for causing said motor to stop when said valve reaches a predetermined position, and a second position sensor for causing said motor to slow when said valve reaches a second predetermined position.

2. The regenerative thermal oxidizer of claim 1, wherein said motor brake has a variable frequency drive.

3. The regenerative thermal oxidizer of claim 1, further comprising power dissipating resistors.

4. The regenerative thermal oxidizer of claim 1, further comprising external energy storage means.

5. The regenerative thermal oxidizer of claim 1, further comprising means for moving said valve vertically.

6. The regenerative thermal oxidizer of claim 1, wherein said first position sensor is an encoder.

7. The regenerative thermal oxidizer of claim 1, further comprising a sensor for measuring valve rotation speed.

8. The regenerative thermal oxidizer of claim 1, further comprising a gear set for engaging said valve.

9. The regenerative thermal oxidizer of claim 1, wherein said gear set comprises spur gears, bevel gears or rack and pinion gears.

10. The regenerative thermal oxidizer of claim 1, wherein said means for moving said valve vertically comprises a pneumatic cylinder.

11. The regenerative thermal oxidizer of claim 1, where in said pneumatic cylinder comprises pressure regulating means.

12. The regenerative thermal oxidizer of claim 1, wherein said pressure regulating means is electronically controlled.

13. The regenerative thermal oxidizer of claim 1, wherein said valve actuation is reversing in angular direction and comprises rotary oscillating or reversing motion of 180 degrees.

* * * * *